April 16, 1968     J. R. FROST     3,377,709
WINDING APPARATUS
Filed June 24, 1966
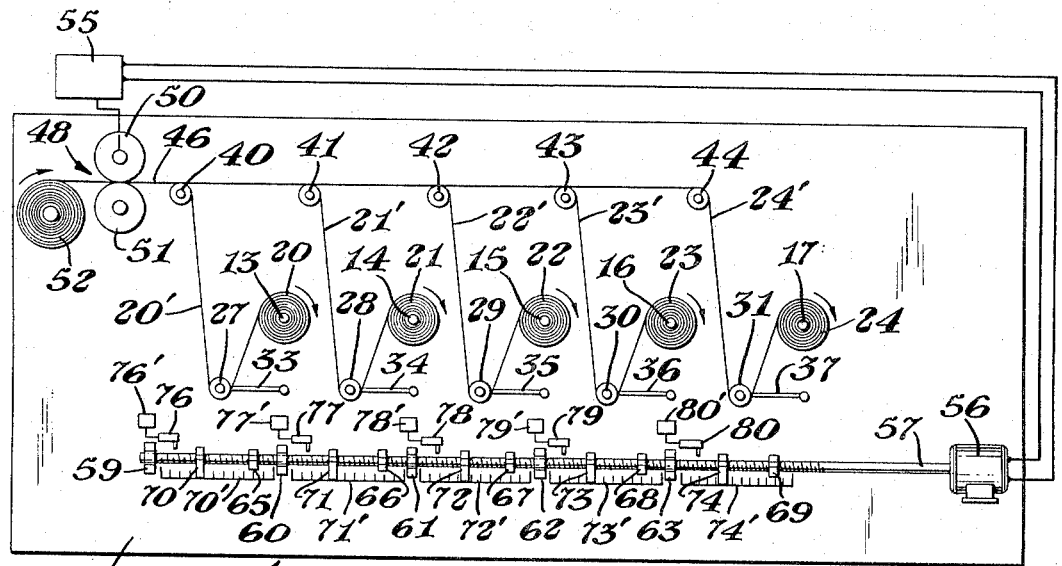
Fig. 1
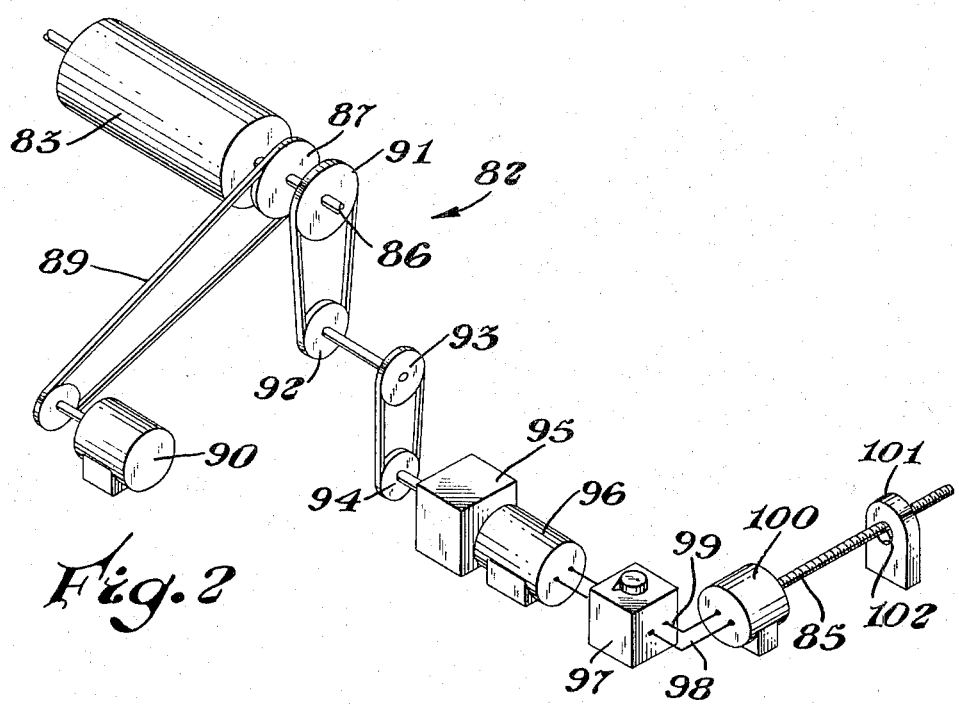
Fig. 2
INVENTOR.
John R. Frost
BY 
AGENT 3,377,709
WINDING APPARATUS
John R. Frost, Midland, Mich., assignor to The Dow
Chemical Company, Midland, Mich., a corporation of
Delaware
Continuation-in-part of application Ser. No. 361,857,
Apr. 22, 1964. This application June 24, 1966, Ser.
No. 560,389
3 Claims. (Cl. 33—132)

ABSTRACT OF THE DISCLOSURE

A multiple spindle winding machine for winding filaments into packages having a predetermined length and having a fixed ratio of rotation between a snubber roll over which the filaments pass and a lead screw, and a plurality of sets, each set associated with a spindle and comprising a nut normally threadedly engaged with said lead screw and optionally disengaged therefrom and longitudinally slidable along said lead screw in the disengaged position between a stop affixed to said lead screw and a switch and operatively connected signal means disposed adjacent said lead screw, and a scale adapted to aid in the positioning of said nut along said lead screw. The nut being adapted to engage the switch and activate the signal means when a desired length of filament is wound on a spindle.

---

This application is a continuation-in-part application of copending application Ser. No. 361,857, filed Apr. 22, 1964.

This invention relates to an improved winding apparatus. It more particularly relates to a winding apparatus having a predetermined length counter.

Frequently it is desired to wind a plurality of filaments of equal length, for example, in preparing a warp. Oftentimes warps of relatively short length are desired such as in the manufacture of specialty goods such as novelty fabrics and the like. Such materials are frequently woven from expensive filaments and when it is desired to provide a warp of given length it must be carefully measured, or otherwise a significant waste will occur. A number of winders have been prepared which utilize predetermining counters which permit each individual filament to be measured as it is wound to form a warp beam. However, such devices in the past have been relatively expensive, cumbersome, and required manual resetting of the counters in a time consuming manner. Typical devices that have been used have been split nuts and the like. Such devices oftentimes require a relatively long time to reset.

It is therefore an object of this invention to provide improved winding apparatus wherein predetermined length counters are employed which are simple, quickly resettable and use highly reliable components.

It is a further object of this invention to provide a simple predetermined footage counter which is readily applied to any multiple spindle winder.

It is another object of this invention to provide a predetermining footage counter which may be remotely located from the multiple spindle winder, in any convenient position.

A still further object of this invention is to provide a predetermining counter and a multiple spindle winding machine which may be readily reset.

These benefits and other advantages in accordance with the invention are readily achieved in a multiple spindle winding machine having a common snubber roll over which the filaments pass without significant slippage, the improvement which comprises, an alternating current generator coupled to said snubber roll, a synchronous motor affixed to a lead screw, an output voltage and current of the alternator being connected to said synchronous motor, the motor and the alternator being so constructed and arranged as to provide a fixed ratio of rotation between the snubber roll and the lead screw, said lead screw having a plurality of nuts thereon, said nuts being threadably engaged with the lead screw, said nuts being resiliently urged against said lead screw and being of sufficient size so that the nuts may be manually positioned along the length of the lead screw, a plurality of stops affixed to said lead screw, a stop being provided for each of said nuts and being positioned generally adjacent thereto, a plurality of switches disposed adjacent said lead screw and so constructed and arranged that the operating means of each of said switches is engaged and operated by a nut, each of said switches being positioned remote from a stop and adjacent a nut, a scale is positioned generally adjacent and parallel to said lead screw adjacent to the nuts, the scale aiding in the positioning of a nut with respect to a switch, and a signal means operatively connected to said switches.

Other benefits and advantages of the invention will become more apparent when the following specification is taken in connection with the drawing wherein:

FIGURE 1 is a simplified schematic representation of a winder in accordance with the present invention;

FIGURE 2 is a schematic representation of one embodiment of a linkage between the counting device and a snubber roll.

In FIGURE 1 there is schematically represented a winder generally designated by the reference numeral 10. The winder 10 comprises a frame 11, a plurality of driven spindles 13, 14, 15, 16 and 17, the spindles being driven by a constant tension means (not shown). Upon each of the the spindles 13, 14, 15, 16 and 17 are packages or spools of filament 20, 21, 22, 23 and 24, respectively. On packages 20–24 are wound the filaments 20′, 21′, 22′, 23′ and 24′. The filaments 20′–24′ are tensioned by means of the dancer roll assemblies 27, 28, 29, 30 and 31. The dancer roll assemblies are pivoted from the frame 11 by means of the pivot arms 33, 34, 35, 36 and 37. Prior to contacting the dancer roll assemblies 27–31, each of the respective filaments passes through the thread guides 40, 41, 42, 43 and 44. The filaments 20′, 21′, 22′, 23′ and 24′ are provided by a plurality of filaments or warp 46 which is gripped and forwarded by the snubber roll assembly 48. The snubber roll assembly 48 comprises a driven roll 50 and an idler roll 51. The idler roll 51 is resiliently tensioned against the driven roll 50. The driven roll 50 is operatively connected to an alternator 55. The warp 46 is unwound from the multiple filament source or warp beam 52. The output voltage of the alternator 55 is operatively connected to synchronous motor 56. The synchronous motor 56 is connected to a lead screw 57. The lead screw 57 is supported by the bearings 59, 60, 61, 62 and 63. Supported on the shaft of the lead screw 57 are a plurality of stops 65, 66, 67, 68 and 69. Associated with the respective stops are resiliently urged nuts 70, 71, 72, 73 and 74 having associated scales 70′, 71′, 72′, 73′ and 74′, respectively. Disposed generally adjacent the stops 65–69 are switches 76, 77, 78, 79 and 80, respectively, and operatively associated indicators or signalling means 76′, 77′, 78′, 79′ and 80′.

In FIGURE 2 there is illustrated a schematic representation of the drive generally indicated by the reference numeral 82 between the snubber roll 83 and the lead screw 85 of a winder such as illustrated in FIGURE 1. The snubber roll 83 is supported on a shaft 86 which carries a driven pulley 87. The pulley 87 is driven by the driving motor 90 through the belt 89. A driving pulley 91 is mounted on shaft 86 which in turn drives the pulley 92 which is rigidly connected to the pulley 93 which in turn drives the pulley 94. The pulley 94 operates a gear train 95 whose output in turn drives an alternator 96. The output of the alternator 96 is optionally fed into a variable auto transformer 97 which is connected by the leads 98 and 99 to the synchronous gear reduction motor 100. Rotation of the motor 100 causes the lead screw 85 to revolve, thus altering the position of the resiliently tensioned nut 101. The nut 101 has an internally threaded hole 102 substantially larger in diameter than the lead screw 85.

One particularly simple embodiment of such an arrangemen can utilize for example a ½ inch diameter lead screw having 20 threads per inch and a nut having ¾ inch opening threaded with 20 threads per inch. The nut having an asymmetrical configuration such as nut 101 of FIGURE 2. Gravity resiliently urges the nut against the lead screw and prevents rotation with the lead screw or threaded shaft. The nut is readily positioned manually on the lead screw 85.

The operation of the present invention will be described with reference to one of the winding stations. However, the operation of the other winding stations is identical. In starting the apparatus, the nut 70 is positoned adjacent the stop 65 on the lead screw 57. A core is placed on the spindle 13 and the filament 20' is secured to the core and the filament 20' is then wound onto the core on spindle 13 to form the package 20 as the lead screw 57 rotates, driving the nut 70 toward the switch 76. When the nut 70 reaches the switch 76 a suitable signal is provided, the package 20 removed, the nut 70 returned to the stop 65 and a fresh package started. The warp beam 52 provides the warp or plurality of filaments 46 to the snubber assembly 48. The snubber assembly 48 forwards the warp 46 to the thread guides 40–44 and on to the various winding stations. The roll 50 of the assembly 48 rotates the alternator 55. The alternator 55 drives the synchronous motor 56 which rotates the lead screw 57 at a rate proportional to the length of warp forwarded by the snubber assembly 48. In order to provide a satisfactory rate of travel for the nuts 70–74 it is desirable that the motor 56 be provided with a gear reduction. Frequently a gear reduction in the ratio of about 1000:1 or even greater is found to be very satisfactory. The particular ratio employed will be dependent on factors such as the pitch of the lead screw, the size of the desired warp and the like well known mechanical factors. Operation of the winding device in accordance with the present invention on synthetic resinous filaments has been found entirely satisfactory and maintains the package size well within a tolerance of ±0.3 percent. The construction of the present invention is particularly beneficial in that it permits the use of low cost components such as are readily available in the form of small alternating current generators, clock motors and the like, to fabricate a highly accurate and yet inexpensive device which permits maintaining package size within extremely close tolerances. From packages wound with the apparatus of the invention warp beams having exceptionally uniform filament length and minimum wastage are prepared.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a multiple spindle winding machine for winding filaments, the winding machine having a common snubber over which the filaments pass without significant slippage, the improvement which comprises an alternating current generator coupled to the snubber, a lead screw, a synchronous motor affixed to the lead screw, the output voltage and current of the alternator being operatively connected to the synchronous motor and having sufficient power to rotate the synchronous motor and lead screw at a rate directly proportional to the rate of rotation of the alternator, the motor and the alternator being so constructed and arranged as to provide a ratio of rotation between the snubber roll and the lead screw rotated by the synchronous motor, a plurality of sets, each set comprising a nut having an internal thread, a stop, a switch and a signal means, each set associated with and adjacent to one spindle, the nut of each set disposed on the lead screw, a portion of the thread of the nut being normally threadedly engaged with the lead screw and optionally disengageable therefrom, the nut being a longitudinal sliding fit for the lead screw when disengaged, the nut normally being resiliently urged against the lead screw, the stop of each set fixed to the lead screw, the stop being positioned generally adjacent the nut, the switch of each set disposed adjacent the lead screw and so constructed and arranged that the operating means of the switch is engaged and operated by the nut moving in threadable engagement with the lead screw, the switch being positioned remote from the stop and adapted to be engaged by the nut when a desired length of filament is wound onto the spindle, a scale adapted to aid in the positioning of the nut of each set on the lead screw with respect to the switch when the nut is disengaged from the lead screw and a signal means operatively connected to the switch and activated by contact of the nut with the operating means of the switch.

2. In a multiple spindle textile filament rewinding apparatus having a plurality of spindles driven by a constant tension means wherein the filaments being fed to the multiplicity of spindles are forwarded by a constant surface speed set of snubber rolls which do not permit significant slippage of the filaments, the improvement which comprises a lead screw, a plurality of sets, each set being in association with and adjacent one spindle, each set comprising a stop on the lead screw, a nut having an internally threaded hole substantially larger than the lead screw and adapted to receive said lead screw, the nut being normally threadedly engaged with the lead screw and optionally disengageable therefrom and longitudinally slidable along said lead screw in the disengaged position, an indicator means, said indicator means having an operating means remote from the stop, the operating means adapted to engage the nut when a desired length of filament is wound onto the associate spindle, an alternator operatively connected to and driven by the snubber rolls at a speed proportional to the snubber rolls, the output of said alternator being connected to a synchronous motor, the synchronous motor adapted to rotate the lead screw at a speed proportional to the rotation of the snubber rolls.

3. In a multiple spindle winding machine having a plurality of spindles for winding of textile filaments, yarns, and the like into packages of a predetermined size, the filaments to be wound into the packages being forwarded by means of snubber rolls which forward filaments at a rate directly proportional to the surface speed thereof, the improvement which comprises an alternator connected to the snubber rolls and rotating at a speed directly proportional thereto, a synchronous motor in operative connection with the alternator, the motor being driven at a speed directly proportional to the rotational speed of the alternator, the synchronous motor connected to the lead screw and rotating the lead screw at a rate directly proportional to the rate of rotation of the synchronous motor, the lead screw being positioned generally adjacent the spindles of the rewind machine, adjacent each of the spindles a set comprising a switch having an operating means, a stop member affixed to the lead screw, a nut having an internal thread and a portion of said thread normally threadedly engaging the lead screw and optionally disengageable from the lead screw, the nut positioned on the lead screw between the stop member and the switch operating means and when said portion is threadedly engaging the lead screw said nut adapted to be moved upon the lead screw between the stop and the switch operating means by the rotation of the lead screw and when said portion is disengaged from the lead screw said nut is adapted to be moved in a longitudinal direction on the lead screw without rotation of the lead screw or the nut, the switch adjacent the lead screw being positioned remote from the stop, the nut being adapted to travel along the lead screw from the stop to the switch and engage the switch operating means when a desired length of filament is wound on the spindle, and activate an electrically operated signal means operatively connected to the switch, the rate of rotation of the lead screw and rate of travel of the nut being chosen in such a manner as to permit the desired size of package to be prepared while the nut is forwarded along the lead screw for a distance up to the distance between the operating means of the switch and its associated stop.

No references cited.

LEONARD FORMAN, *Primary Examiner.*

R. A. FIELDS, *Examiner.*